(12) United States Patent
Imber

(10) Patent No.: US 10,885,427 B2
(45) Date of Patent: Jan. 5, 2021

(54) ERROR ALLOCATION FORMAT SELECTION FOR HARDWARE IMPLEMENTATION OF DEEP NEURAL NETWORK

(71) Applicant: Imagination Technologies Limited, Kings Langley (GB)

(72) Inventor: James Imber, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 135 days.

(21) Appl. No.: 16/181,104

(22) Filed: Nov. 5, 2018

(65) Prior Publication Data
US 2019/0227893 A1    Jul. 25, 2019

(30) Foreign Application Priority Data

Nov. 3, 2017 (GB) .................................. 1718295.7

(51) Int. Cl.
*G06F 11/00* (2006.01)
*G06N 3/063* (2006.01)
(Continued)

(52) U.S. Cl.
CPC ........... *G06N 3/063* (2013.01); *G06F 7/4836* (2013.01); *G06F 17/11* (2013.01); *G06N 3/084* (2013.01);
(Continued)

(58) Field of Classification Search
CPC .... G06F 11/2263; G06F 17/11; G06F 7/4836; G06N 3/063; G06N 3/0684; G06N 3/0472; G06N 3/0481
See application file for complete search history.

(56) References Cited

U.S. PATENT DOCUMENTS

2014/0046885 A1* 2/2014 Majumdar ............. G06N 3/049
706/22
2016/0328645 A1* 11/2016 Lin ......................... G06N 20/00
(Continued)

FOREIGN PATENT DOCUMENTS

WO    2016/182671 A1    11/2016

OTHER PUBLICATIONS

Balduzzi, David et al., Neural Taylor Approximations: Convergence and Exploration in Rectifier Networks, International Conference on Machine Learning 2017 (Year: 2017).*
Anwar, Sajid et al., Fixed Point Optimization of Deep Convolutional Neural Networks for Object Recognition, IEEE, 2015 (Year: 2015).*
(Continued)

*Primary Examiner* — Marc Duncan
(74) *Attorney, Agent, or Firm* — Potomac Law Group, PLLC; Vincent M DeLuca

(57) ABSTRACT

Methods for determining a fixed point format for one or more layers of a DNN based on the portion of the output error of the DNN attributed to the fixed point formats of the different layers. Specifically, in the methods described herein the output error of a DNN attributable to the quantisation of the weights or input data values of each layer is determined using a Taylor approximation and the fixed point number format of one or more layers is adjusted based on the attribution. For example, where the fixed point number formats used by a DNN comprises an exponent and a mantissa bit length, the mantissa bit length of the layer allocated the lowest portion of the output error may be reduced, or the mantissa bit length of the layer allocated the highest portion of the output error may be increased. Such a method may be iteratively repeated to determine an optimum set of fixed point number formats for the layers of a DNN.

19 Claims, 14 Drawing Sheets

(51) Int. Cl.
*G06N 3/08* (2006.01)
*G06F 7/483* (2006.01)
*G06F 17/11* (2006.01)
*G06N 3/04* (2006.01)

(52) U.S. Cl.
CPC ......... *G06N 3/0472* (2013.01); *G06N 3/0481* (2013.01)

(56) References Cited

U.S. PATENT DOCUMENTS

| | | | |
|---|---|---|---|
| 2016/0328647 A1 | 11/2016 | Lin et al. | |
| 2017/0061279 A1 | 3/2017 | Yang et al. | |
| 2018/0060278 A1* | 3/2018 | Lin | G06F 17/17 |
| 2019/0095777 A1* | 3/2019 | Kim | G06N 3/063 |
| 2019/0228293 A1* | 7/2019 | Imber | G06F 7/5443 |
| 2019/0236436 A1* | 8/2019 | Imber | G06F 17/11 |
| 2019/0236449 A1* | 8/2019 | Imber | G06N 3/063 |

OTHER PUBLICATIONS

Gysel et al., "Hardware-Oriented Approximation of Convolutional Neural Networks," Cornell University Library, ICLR Apr. 2016, pp. 1-8.
Lin et al., "Fixed Point Quantization of Deep Convolutional Networks," Proceeding ICML'16 Proceedings of the 33rd International Conference on International Conference on Machine Learning, vol. 48, pp. 2849-2858, New York, NY, USA—Jun. 19-24, 2016.
Moons et al., "Energy-Efficient ConvNets Through Approximate Computing," Cornell University Library, arXiv.org > cs > arXiv:1603.06777, Mar. 22, 2016.
Sakr et al., "Analytical Guarantees on Numerical Precision of Deep Neural Networks" Proceedings of the 34th International Conference on Machine Learning, Sydney, Australia, PMLR 70, 2017, 10 pages.
Lin et al; "Fixed Point Quantization of Deep Convolutional Networks"; Retrieved from the Internet: URL:https://arxiv.org/pdf/1511.06393v2.pdf; Under review as a conference paper at ICLR 2016; Jan. 7, 2016; pp. 1-15.

* cited by examiner

ERROR ALLOCATION FORMAT SELECTION FOR HARDWARE IMPLEMENTATION OF DEEP NEURAL NETWORK

BACKGROUND

A Deep Neural Network (DNN) is a type of artificial neural network that can be used for machine learning applications. In particular, a DNN can be used in signal processing applications, including image processing and computer vision applications.

DNNs have been implemented in applications where power resources are not a significant factor. Despite this, DNNs have application in a number of different technical fields in which the resources of the hardware used to implement the DNNs is such that power consumption, processing capabilities, or silicon area are limited.

There is therefore a need to implement hardware that is configured to implement a DNN in an efficient manner, i.e. in a manner that requires less silicon area or less processing power when operating. Moreover, DNNs can be configured in a number of different ways for a variety of different applications. There is therefore also a need for hardware for implementing a DNN to be flexible to be able to support a variety of DNN configurations.

The embodiments described below are provided by way of example only and are not limiting of implementations which solve any or all of the disadvantages of known hardware implementations of deep neural networks.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods for determining a fixed point number format for one or more layers of a DNN based on the portion of the output error of the DNN attributed to the quantisation of the weights and/or input data values of each layer. Specifically, in the methods described herein the output error of a DNN attributable to the quantisation of the weights or input data values of each layer is determined using a Taylor approximation and the fixed point number format of one or more layers is adjusted based on the attribution. For example, where each fixed point number format used by a DNN to represent weights and/or input data values comprises an exponent and a mantissa bit length, the mantissa bit length of the layer(s) attributed the lowest portion of the output error may be reduced, or the mantissa bit length of the layer(s) attributed the highest portion of the output error may be increased. Such a method may be iteratively repeated to determine an optimum set of fixed point number formats for the layers of a DNN within a predetermined maximum output error.

A first aspect provides a computer-implemented method of determining a fixed point number format for representing values of one or more layers of a Deep Neural Network "DNN" for use in configuring a hardware implementation of the DNN, the values comprising at least one of weights and input data values, the method comprising: receiving an instantiation of the DNN configured to represent values of one or more layers according to one or more initial fixed point number formats for that layer; determining an output of the instantiation of the DNN in response to test input data; determining a differentiable error in the output of the instantiation of the DNN relative to a baseline output; determining a portion of the differentiable error related to quantisation of the values of each of the one or more layers using a Taylor approximation; and adjusting a fixed point number format for at least one of the one or more layers based on the portion of the differentiable error related to quantisation of the values of each of the one or more layers.

A second aspect provides a computing-based device for determining a fixed point number format for representing values of one or more layers of a Deep Neural Network "DNN" for use in configuring a hardware implementation of the DNN, the values comprising at least one of input data values and weights, the computing-based device comprising: at least one processor; and memory coupled to the at least one processor, the memory comprising: an instantiation of the DNN configured to represent values of one or more layers according to one or more initial fixed point number formats for that layer; and computer readable code that when executed by the at least one processor causes the at least one processor to: determine an output of the instantiation of the DNN in response to test input data; determine a differentiable error in the output of the instantiation of the DNN relative to a baseline output; determine a portion of the differentiable error related to quantisation of the values of each of the one or more layers using a Taylor approximation; and adjust a fixed point number format for at least one of the one or more layers based on the portion of the differentiable error related to quantisation of the values of each of the one or more layers.

A third aspect provides a hardware implementation of a Deep Neural Network "DNN" comprising: hardware logic configured to: receive input data values to a layer of the DNN; receive information indicating a fixed point number format for the input data values of the layer, the fixed point number format for the input data values of the layer having been selected in accordance with the method of the first aspect; interpret the input data values based on the fixed point number format for the input data values of the layer; and process the interpreted input data values in accordance with the layer to generate output data values for the layer.

The hardware implementation of the DNN may be embodied in hardware on an integrated circuit. There may be provided a method of manufacturing, at an integrated circuit manufacturing system, the hardware implementation. There may be provided an integrated circuit definition dataset that, when processed in an integrated circuit manufacturing system, configures the system to manufacture the hardware implementation of the DNN. There may be provided a non-transitory computer readable storage medium having stored thereon a computer readable description of a hardware implementation of a DNN that, when processed in an integrated circuit manufacturing system, causes the integrated circuit manufacturing system to manufacture an integrated circuit embodying a hardware implementation of a DNN.

There may be provided an integrated circuit manufacturing system comprising: a non-transitory computer readable storage medium having stored thereon a computer readable description of the hardware implementation of the DNN; a layout processing system configured to process the computer readable description so as to generate a circuit layout description of an integrated circuit embodying the hardware implementation of the DNN; and an integrated circuit generation system configured to manufacture the hardware implementation of the DNN according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
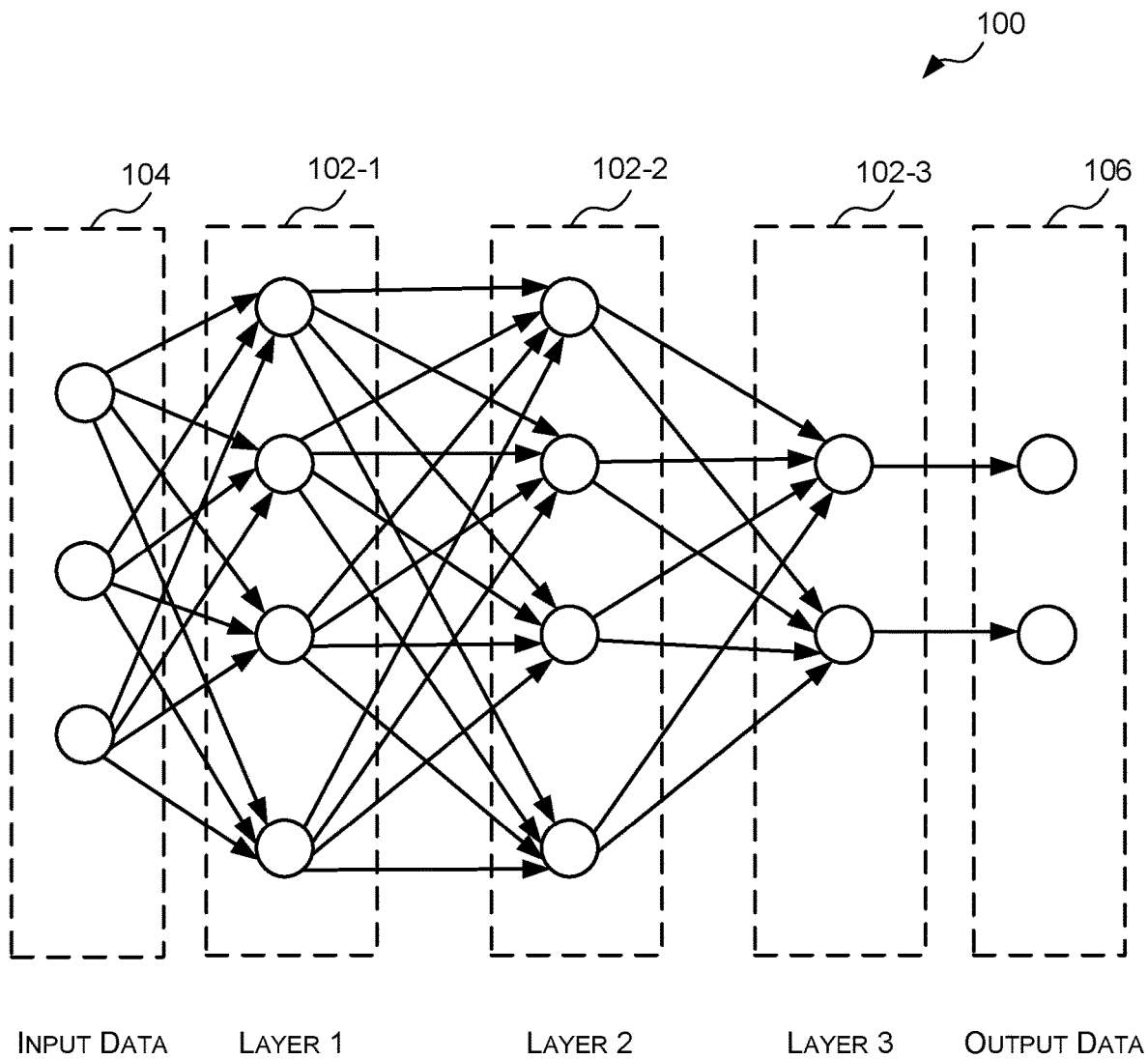
FIG. 1 is a schematic diagram of an example deep neural network (DNN)

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A Deep Neural Network (DNN) is a form of artificial neural network comprising a plurality of interconnected layers that enable the DNN to perform signal processing tasks, including, but not limited to, computer vision tasks. FIG. 1 illustrates an example DNN 100 that comprises a plurality of layers 102-1, 102-2, 102-3. Each layer 102-1, 102-2, 102-3 receives input data, processes the input data in accordance with the layer to produce output data. The output data is either provided to another layer as the input data, or is output as the final output data of the DNN. For example, in the DNN 100 FIG. 1 the first layer 102-1 receives the original input data 104 to the DNN 100 and processes the input data in accordance with the first layer 102-1 to produce output data. The output data of the first layer 102-1 becomes the input data to the second layer 102-2 which processes the input data in accordance with the second layer 102-2 to produce output data. The output data of the second layer 102-2 becomes the input data to the third layer 102-3 which processes the input data in accordance with the third layer 102-3 to produce output data. The output data of the third layer 102-3 is output as the output data 106 of the DNN.

The processing that is performed on the input data to a layer depends on the type of layer. For example, each layer of a DNN may be one of a plurality of different types. Example DNN layer types include, but are not limited to: a convolution layer, an activation layer, a normalisation layer, a pooling layer and a fully connected layer. It will be evident to a person of skill in the art that these are example DNN layer types and that this is not an exhaustive list and there may be other DNN layer types.

For a convolution layer the input data is processed by convolving the input data using weights associated with that layer. Specifically, each convolution layer is associated with a plurality of weights $w_1 \ldots w_g$ which may also be referred to as filter weights or coefficients. The weights may be grouped to form or define one or more filters or kernels, and each filter may be associated with an offset bias b.

Figure 2:
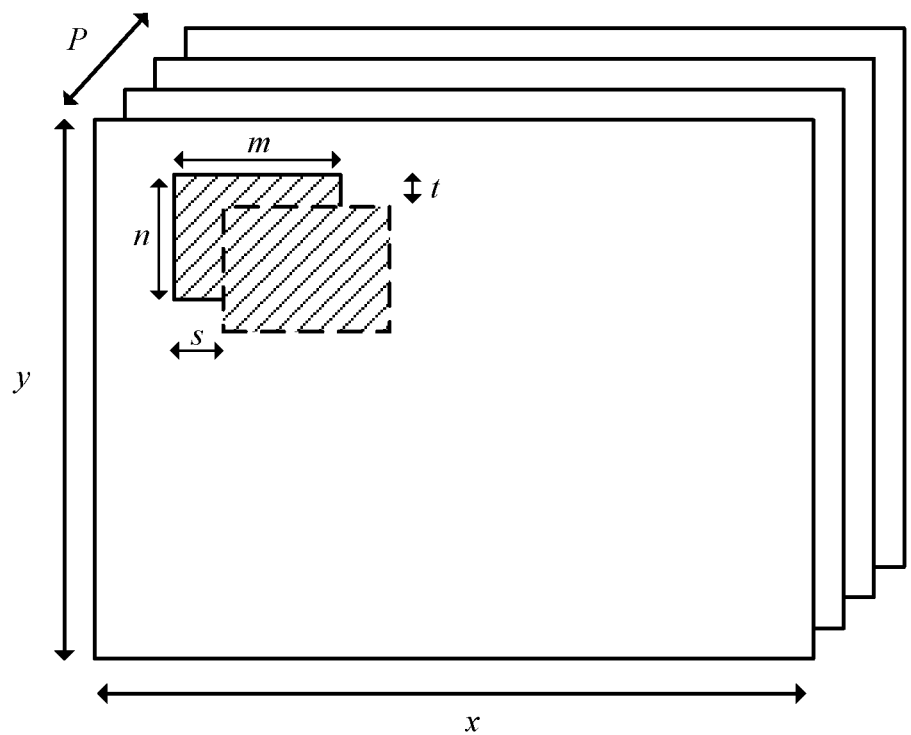
FIG. 2 is a schematic diagram of example data in a DNN.

Reference is made to FIG. 2 which illustrates an example overview of the format of data utilised in a DNN. As can be seen in FIG. 2, the data used in a DNN may be arranged as P planes of data, where each plane has a dimension x×y. A DNN may comprise one or more convolution layers each of which has associated therewith a plurality of filters each of which comprises a plurality of weights. Each filter has a dimension m×n×P (i.e. each filter comprises a set of m×n×P weights w) and is applied to the input data according to a convolution operation across several steps in direction s and t, as illustrated in FIG. 2. The number of filters and the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, performs one or more activation functions on the input data to the layer. An activation function takes a single number and performs a certain non-linear mathematical operation on it. In some examples, an activation layer may act as rectified linear unit (ReLU) by implementing an ReLU function (i.e. $f(x)=\max(0,x)$) or a Parametric Rectified Linear Unit (PReLU) by implementing a PReLU function.

A normalisation layer is configured to perform a normalising function, such as a Local Response Normalisation (LRN) Function on the input data. A pooling layer, which is typically, but not necessarily inserted between successive convolution layers, performs a pooling function, such as a max or mean function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a three-dimensional set of input data values and outputs an N dimensional vector. Where the DNN is used for classification N is the number of classes and each value in the vector represents the probability of a certain class. The N dimensional vector is generated through a matrix multiplication of a set of weights, optionally followed by a bias offset. A fully connected layer thus receives a set of weights and/or a bias.

A hardware implementation of a DNN comprises hardware configured to process input data to the DNN in accordance with the layers of the DNN. Specifically, a hardware implementation processes the input data to each layer in accordance with that layer and generates output data for that layer which either becomes the input data to another layer or becomes the output of the DNN. For example, if a DNN comprises a convolution layer followed by an activation layer the hardware implementation for that DNN comprises hardware configured to perform a convolution on the input data to the DNN using the weights and biases associated with that convolution layer to produce output data for the convolution layer, the output data of the convolution layer then becomes the input data to the activation layer where an activation function is applied to the input data to the activation layer to generate output data which is output as the output data of the DNN.

The input data and weights (where applicable) for each layer typically comprises a set of values or numbers. As is known to those of skill in the art, for hardware to process the input data values and weights each input data value and each weight is represented in a number format. The two most suitable number formats are fixed point number formats and floating point number formats. As is known to those skilled in the art, a fixed point number format has a fixed number of digits after the radix point (e.g. decimal point or binary point). In contrast, a floating point number format does not have a fixed radix point (i.e. it can "float"). In other words, the radix point can be placed anywhere within the representation. While representing input data values and weights in a floating point number format may allow more accurate or precise output data to be produced, processing numbers in a floating point number format in hardware is complex which tends to increase the silicon area and complexity of the hardware compared to hardware that processes values in fixed point number formats. Accordingly, hardware implementations may be configured to process input data values and weights in a fixed point number format to reduce the area, power consumption and memory bandwidth of the hardware implementation.

A common fixed point number format is the Q format, which specifies a predetermined number of integer bits a and fractional bits b. Accordingly, a number can be represented as Qa·b which requires a total of a+b+1 bits (including the sign bit). Example Q formats are illustrated in Table 1 below.

TABLE 1

| Q Format | Description | Example |
| --- | --- | --- |
| Q4.4 | 4 integer bits and 4 fractional bits | $0110.1110_2$ |
| Q0.8 | 0 integer bits and 8 fractional bits | $.01101110_2$ |

However, the Q format has a shortcoming in that some of the bits used to represent the number may be considered to be redundant. In an example, a number range [−0.125, 0.125) is to be represented to a precision of 3 bits. The required Q format for this example range and precision is Q0.5. However, if we assume that the range of values is known in advance, the first two bits of the number will never be used in determining the value represented in Q format. For example, the first two bits of the representation do not contribute to the final number since they represent 0.5 and 0.25 respectively and therefore fall outside of the required range. However, they are used to indicate the value of the third bit position (i.e. 0.125 and beyond due to the relative bit positions). Accordingly, the Q format described above is an inefficient fixed point number format for use within a hardware implementation of a DNN since some bits may not convey useful information.

Therefore, in some cases, instead of using the Q format, some hardware implementations may be configured to use a fixed point number format for the input data values and weights wherein each value x is represented by a fixed integer exponent e and an n-bit mantissa m format $x=2^e m$ which is defined by the exponent e and the number n of mantissa bits {e,n}. In some cases, the mantissa m may be represented in two's complement format, and in other cases other signed or unsigned integer formats may be used.

To reduce the size, and increase the efficiency, of a hardware implementation of a DNN the hardware implementation may be configured to process input data values and weights in fixed point number formats that use the smallest number of bits that is able to represent the expected or desired range of input data values or weights. Furthermore, since the range of input data values, or range of weights, may vary per layer, a hardware implementation may be able to process a DNN more efficiently when the fixed point number formats used to represent the input data values or weights can vary per layer. For example, the hardware implementation may be able to implement the DNN more efficiently by using a fixed point number format defined by an exponent of 2 and a mantissa bit length of 6 to represent the input data values for one layer, and a fixed point number format defined by an exponent of 4 and a mantissa bit length of 6 to represent the input data values for another layer.

As a result, it is desirable to identify fixed point number formats (e.g. comprising an exponent and mantissa bit length) for representing values (e.g. input data values, or weights) that are input to, or output from, a layer of a DNN on a per layer basis.

Described herein are methods for determining a fixed point number format for one or more layers of a DNN based on the portion of the output error of the DNN attributed to the quantisation of the weights and/or input data values of each layer. Specifically, in the methods described herein the output error of a DNN attributable to the quantisation of the weights or input data values of each layer is determined using a Taylor approximation; and, the fixed point number format of one or more layers is adjusted based on the attribution. For example, where each fixed point number formats used by a DNN to represent weights and/or input data values comprises an exponent and a mantissa bit length, the mantissa bit length of the fixed point number format used by the layer attributed the lowest portion of the output error may be reduced, or the mantissa bit length of the fixed point number format used by layer attributed the highest portion of the output error may be increased. Such a method may be iteratively repeated to determine an optimum set of fixed point number formats for the layers of a DNN within a predetermined accuracy.

Compared to methods of identifying fixed point number formats for representing weights and/or input data values of a DNN, such as that described in the Applicant's co-pending UK application filed the same day as the present application and entitled HIERARCHICAL MANTISSA BIT LENGTH SELECTION FOR HARDWARE IMPLEMENTATION OF DEEP NEURAL NETWORK which is herein incorporated by reference in its entirety, which use a trial and error approach to identify the fixed point number formats that can be adjusted, in the methods described herein the error allocation quickly identifies the layers that caused the most/least error so the fixed point number formats of those layers can be targeted. This enables the methods described herein to reach an optimum or suitable set of fixed point number formats for the input data values and/or weights of a DNN much faster. Furthermore, the portion of the output error of a DNN attributable to the quantisation of the weights and/or input data values can be determined using a Taylor approximation via backpropagation. Since efficient software implementations of backpropagation have been developed for use in DNN training these software implementations can be used to efficiently identify the fixed point number formats for representing the input data values and/or weights of layers of a DNN.

The term "quantisation of the weights" is used herein to mean that the weights are represented in a fixed point number format. The quantisation error of a weight is the difference between the weight in an original floating point number format and the weight in the fixed point number format. Similarly, the term "quantisation of the input data values" is used herein to mean that the input data vales are represented in a fixed point number format. The quantisation error of an input data value is the difference between the input data value in an original floating point number format and the input data value in the fixed point number format.

Taylor Approximation for Error Allocation

Knowing which layer's quantisation causes the most error in the output of a DNN is useful because it may indicate, for example, which layer's fixed point number format could be further optimised to increase the efficiency of a hardware implementation of a DNN, or which layer's fixed point number format may be adjusted to realise a reduction in the output error of the hardware implementation of the DNN.

Figure 3:
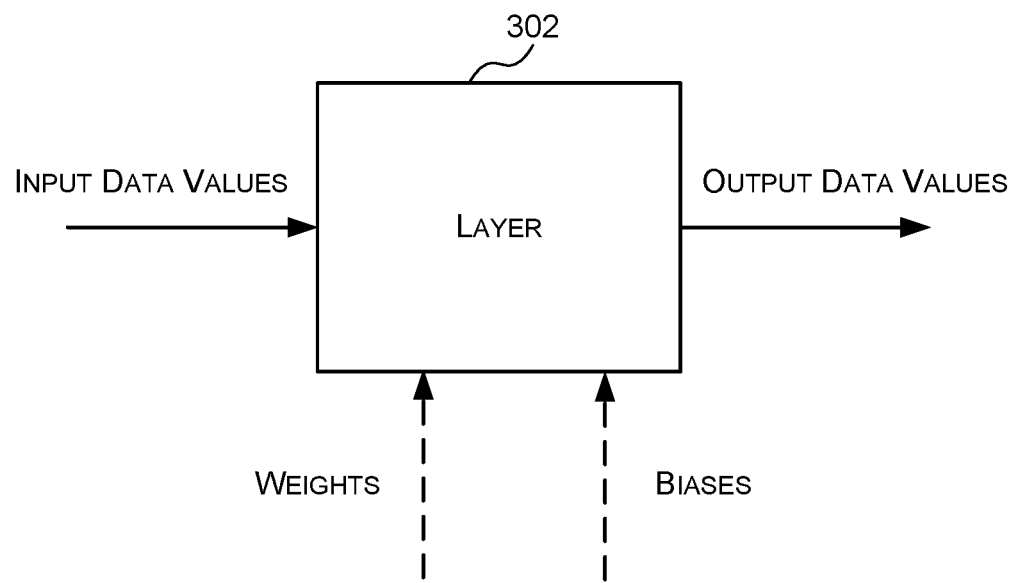
FIG. 3 is a schematic diagram illustrating the values input to and output from a layer of a DNN.

As shown in FIG. 3, each layer 302 of a DNN receives input data values and generates output data values; and some layers (such as convolution layers and fully-connected layers) may also receive weights and/or biases. Each of the input data values, the output data values, weights and biases may be represented in a fixed point number format in a hardware implementation.

For a DNN $f(a;w) \in \mathbb{R}^M$ where a are the input data values and w are the weights, representing the weights in a fixed point number format (which may also be referred to herein as quantising the weights) introduces error $\eta$ in the output as shown in equation (1) where $q_w$ is the quantisation error of the weight w:

$$f(a;w+q_w) = f(a;w) + \eta(a,w,q_w) \qquad (1)$$

Figure 4:
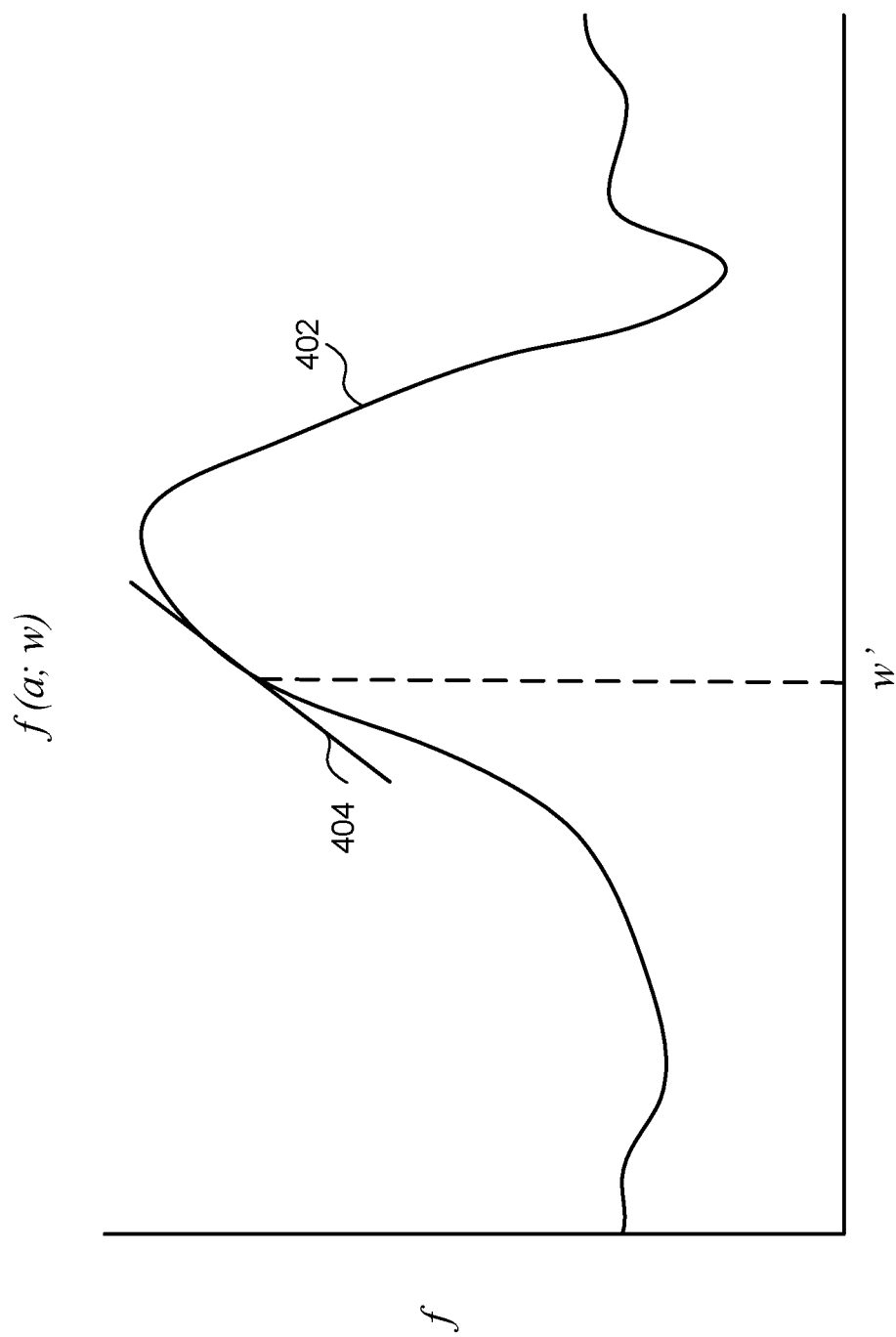
FIG. 4 is a graph illustrating the tangent of the DNN function $f$.

As is known to those of skill in the art, a Taylor series is a representation of a function as an infinite sum of terms that are calculated from the values of the function's derivatives at a single point. A function can be approximated by using a finite number of terms of its Taylor series. $f$ written as a Taylor series is shown in equation (2) where W is the set of weights w, and h is the index to the weights w. As shown in FIG. 4 this gives an approximation of the function $f$ 402 using its tangent 404.

$$f(a; w + q_w) = f(a; w) + \sum_{h \in W} q_{w_h} \frac{\partial f}{\partial w_h} + O\left(\frac{\partial^2 f}{\partial w_h^2}\right) \qquad (2)$$

The error $\eta$ for each output i can then be approximated using equation (3):

$$\eta_i = \sum_{h \in W} q_{w_h} \frac{\partial f_i}{\partial w_h} \qquad (3)$$

This can be broken down by layer and re-written as a sum over layers L as shown in equation (4) wherein $\eta_i^l$ is the contribution of the quantisation of the weights of layer l to the error in the $i^{th}$ output.

$$\eta_i \approx \sum_{l \in L} \sum_{h \in W_l} q_{w_h} \frac{\partial f_i}{\partial w_h} = \sum_{l \in L} \eta_i^l \qquad (4)$$

The total contribution of the quantisation of the weights of a layer l to the error in the $i^{th}$ output ($\eta_i^l$) can then be expressed as shown in equation (5) and the total contribution to all outputs ($\eta^l$) can be expressed as shown in equation (6)

$$\eta_i^l = \sum_{h \in W_l} q_{w_h} \frac{\partial f_i}{\partial w_h} \qquad (5)$$

$$\eta^l = \sum_i \sum_{h \in W_l} q_{w_h} \frac{\partial f_i}{\partial w_h} \qquad (6)$$

Accordingly, the portion of the output error attributable to the quantisation error of the weights of each layer ($\eta^l$) can be determined via a Taylor approximation.

In a similar way, equation (7) can be derived from the Taylor series to determine the portion of the output error attributable to the quantisation error of the input data values a of each layer wherein A is the set of input data values a and h is the index to the input data values a.

$$\eta^l = \sum_i \sum_{h \in A_l} q_{a_h} \frac{\partial f_i}{\partial a_h} \qquad (7)$$

Determination of Derivatives Via Backpropogation

Figure 5:
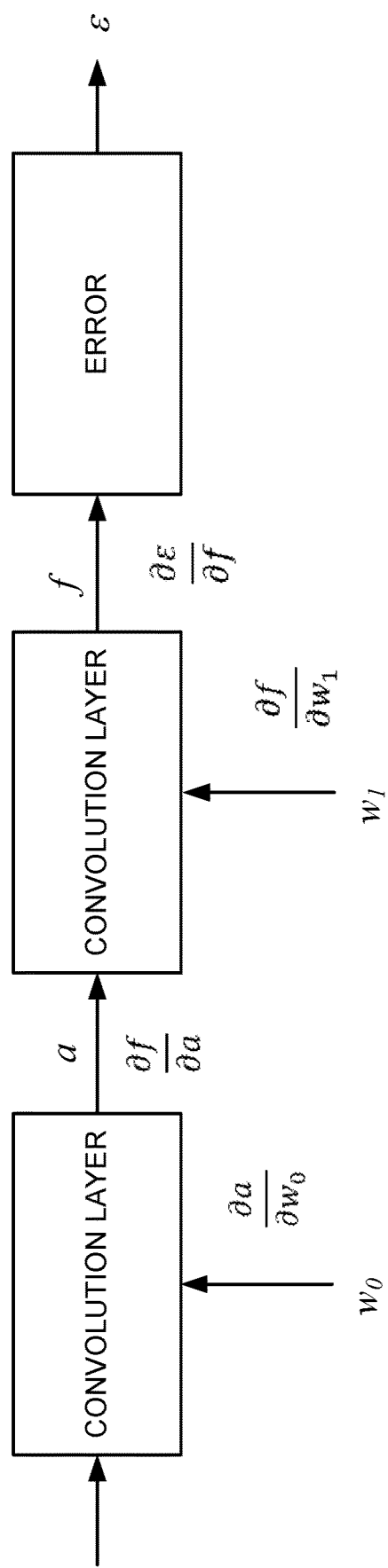
FIG. 5 is a schematic diagram illustrating backpropagation.

Backpropogation (which may also be referred to as backpropogation of errors) is a method used in training of DNNs to calculate the gradient of the error with respect to network data and parameters (such as weights) of the DNN after a set of test input data is applied to (or processed by) a DNN. As shown in FIG. 5 backpropogation can be used to determine the derivaties of an error ε with respect to the function's parameters (a and w in this case). If a suitable error ε (a differentiable error) is chosen then backpropagation can be used to determine the derivatives of equation (6) or equation (7) as shown in equation (8)

$$\varepsilon = f_i \Rightarrow \frac{\partial \varepsilon}{\partial w_h} = \frac{\partial f_i}{\partial w_h} I \qquad (8)$$

Specifically, setting $$\frac{\partial \varepsilon}{\partial f_i} = 1$$

on the output causes backpropagation to calculate $$\frac{\partial f_i}{\partial w_h}$$

which are the derivatives of equation (6).

The absolute error $\eta_i$ on a single output i due to quantisation of the weights can then be expressed as shown in equation (9) where $$\frac{\partial \varepsilon}{\partial f_i}$$

is set to 1 for $\eta_i$ positive and −1 for $\eta_i$ negative, corresponding to derivatives for absolute error:

$$\sum_i |\eta_i| = \sum_{l \in L} \sum_{h \in W_l} q_{w_h} \frac{\partial \varepsilon}{\partial w_h} \qquad (9)$$

The portion of the output error attributable to the quantisation error of the weights of each layer can thus be approximated as the sum of the derivatives of the output error with respect to the weights of that layer multiplied by the quantisation error associated with the corresponding weight.

Although equations (6) and (7) illustrate how a per layer breakdown of error can be determined this is only an example and similar methods can be used to identify, for example, a per filter/kernel breakdown of error and/or a per weight or per input data value breakdown of error.

Method of Error Allocation

Figure 6:
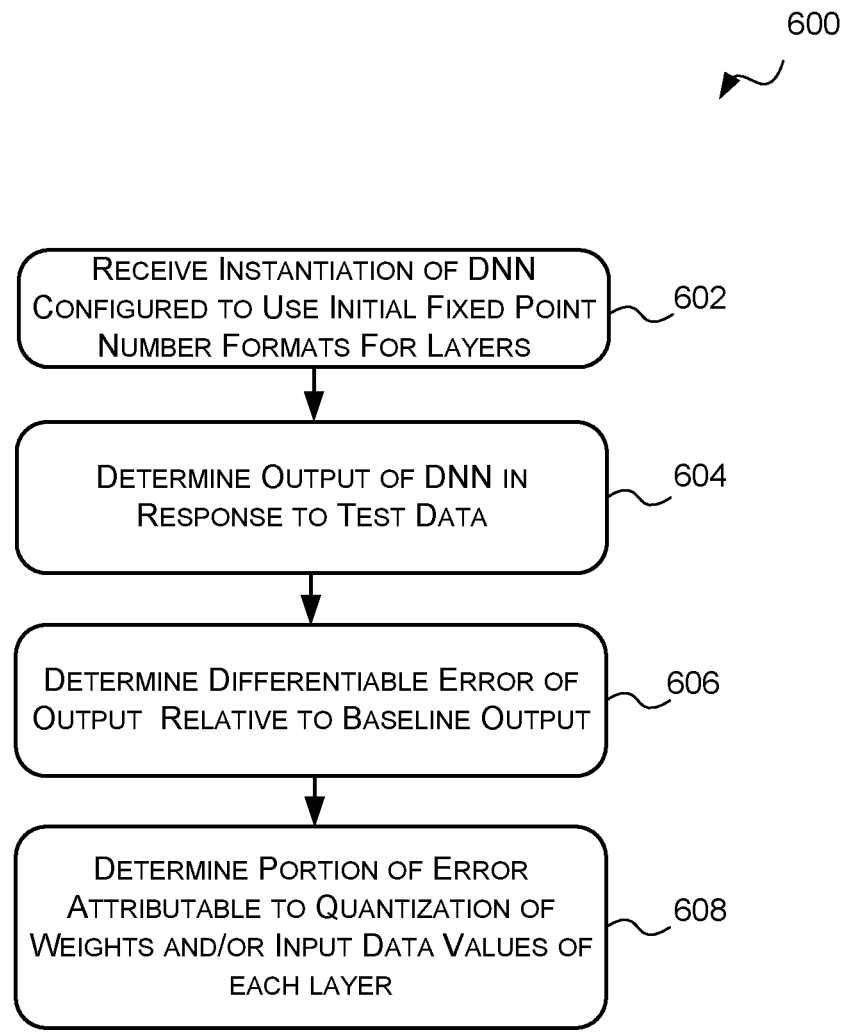
FIG. 6 is a flow diagram of an example method for determining the portion of the output error of a DNN attributable to the quantisation of the weights and/or input data values of each layer.

Reference is now made to FIG. 6 which illustrates a method 600 of determining the portion of the output error of a DNN attributable to quantisation of the weights of a layer (either collectively or individually) and/or attributable to quantisation of the input data values of a layer (either collectively or individually) using a Taylor approximation. The method 600 may be implemented by a computing-based device such as the computing-based device described below with respect to FIG. 12. For example, a computing-based device (e.g. computing-based device 1200) may include, or may have access to, computer readable medium (e.g. memory) that has computer readable instructions stored thereon, that when executed by a processor of the computing-based device causes the computing-based device to execute the method 600 of FIG. 6.

The method 600 begins at block 602, where an instantiation of the DNN that is configured, or initialised, to represent the weights and/or input data values of each layer of the DNN using initial or starting fixed point number format(s) for that layer is received.

Each of the initial fixed point number formats comprises, or is defined by, an exponent e and a mantissa bit length n. The initial or starting fixed point number formats for a layer may have been determined or selected by another method, such as the method described in the applicant's co-pending UK patent application filed the same day as the present application and entitled HISTOGRAM-BASED PER-LAYER DATA FORMAT SELECTION FOR HARDWARE IMPLEMENTATION OF DEEP NEURAL NETWORK which is herein incorporated by reference. In some cases, the initial fixed point number formats for the layers comprise the same mantissa bit length but may have different exponents. For example, the initial fixed point number format for one layer may comprise an exponent of 6 and a mantissa bit length of 12, and the initial fixed point number format for another layer may comprise an exponent of 3 and a mantissa bit length of 12.

An instantiation of a DNN embodies the DNN in a form which can be used to test the response of the DNN to input data. An instantiation of a DNN includes, but is not limited to, a software model of the DNN or a hardware implementation of the DNN. How an instantiation of a DNN is initialised or configured to represent a set of values input to, or output from, a layer using a particular fixed point floating point number depends on the type of values. For example, if the values correspond to an input to the layer, such as the input data values, the weights or the biases of the layer, then initialising or configuring an instantiation of the DNN to represent the set of values of a layer using a particular fixed point number format may comprise converting the input values of that layer to be in the particular fixed point number format and configuring the layer to interpret the input data values according to the fixed point number format; or, configuring the layer to convert any input data values received in another format to the particular fixed point number format. If, however, the values correspond to an output from the layer, such as the output data values, then initialising or configuring an instantiation of the DNN to represent the values of a layer using a particular fixed point number format may comprise configuring the layer to convert the output data values it generates to the predetermined fixed point number format.

Once an instantiation of the DNN has been initialised to represent the input data values and/or weights of each layer in the initial or starting fixed point number formats for each layer the method 600 proceeds to block 604.

At block 604, test input data is provided to the instantiation of the DNN and the output of the instantiation of the DNN in response to the test input data is recorded. Specifically, the test input data propagates through the DNN until it reaches the output.

Where the DNN is a classification network the output of the instantiation of the DNN may be a set of logits. As is known to those of skill in the art, a classification network determines the probability that the input data falls into each of a plurality of classes. The network generally generates a data vector with one element corresponding to each class, and each of these elements is called a logit. For example, a classification network with 1300 potential class labels may output a vector of 1300 logits. In some cases, the output of the instantiation of the DNN may instead be the output of a SoftMax function applied to the logits. As is known to those of skill in the art, the SoftMax function is a transformation applied to the logits output by a DNN so that the values associated with each classification add up to 1. This allows the output of the SoftMax function to represent a probability distribution over the classes. The output of the SoftMax function may be referred to as the SoftMax normalised logits. The SoftMax function can be expressed as shown in equation (10) where si is the softmax output for class i, $z_i$ is the logit for class i, and i and j are vector indices corresponding to the classes:

$$s_i(z) = \frac{e^{z_i}}{\sum_j e^{z_j}} \tag{10}$$

In some cases, multiple sets of test input data may be provided to the instantiation of the DNN. For example, in some cases, where the input data to the DNN is expected to be an image, 10-50 test images may be provided to the instantiation of the DNN. In these cases, the output data may comprise the output data (e.g. logits) generated in response to each test input (e.g. test image).

Although the possible outputs of a classification network have been described, it will be evident to a person of skill in the art that the methods and techniques may be applied to any type of DNNs, such as, but not limited to, regression-type DNNs, including image denoisers and super-resolvers. Once the output of the instantiation of the DNN in response to the test input data has been recorded the method 600 proceeds to block 606.

Figure 7:
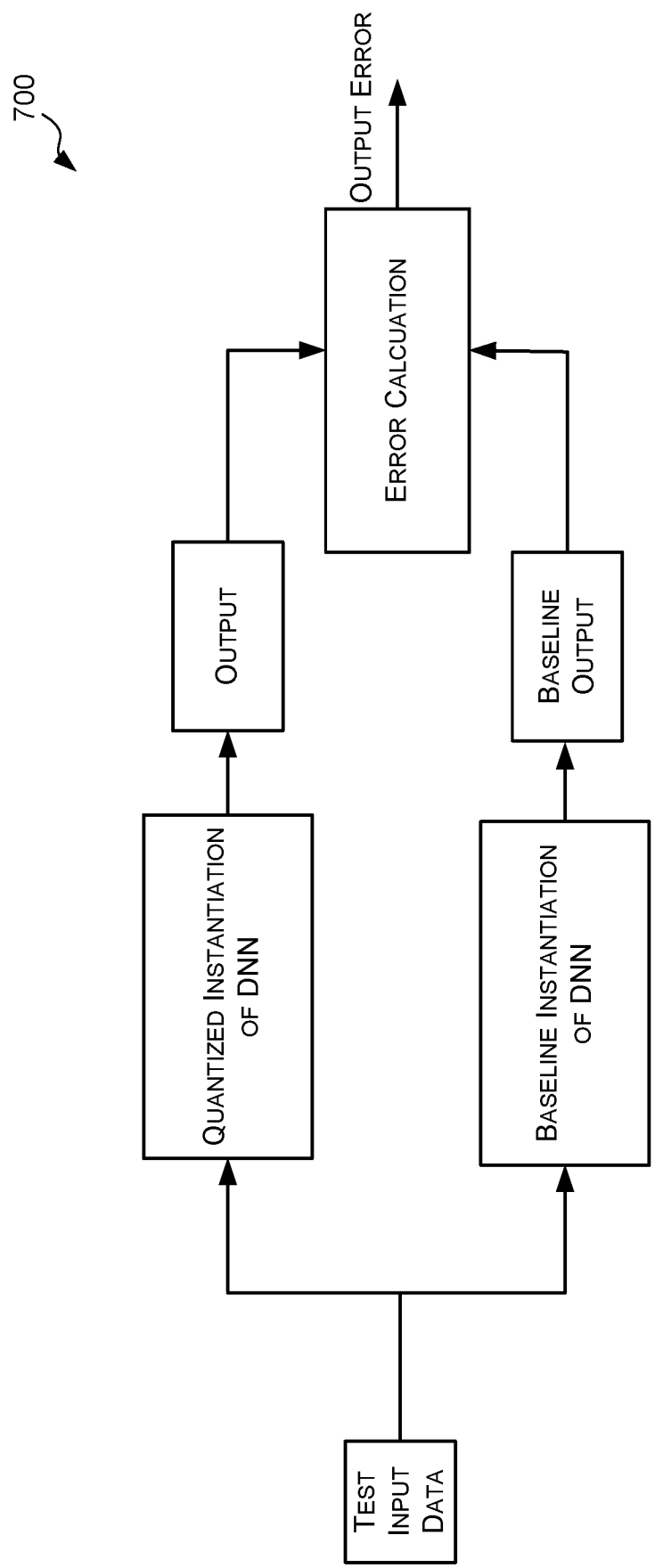
FIG. 7 is a schematic diagram illustrating calculation of the output error of a quantised instantiation of a DNN.

At block 606, a differentiable error (ε) between the output of block 604 and a baseline output as shown at 700 in FIG. 7 is determined. In some cases, the baseline output may be the output of an instantiation of the DNN that is configured to represent the values input to, and output from, each layer in a floating point number format. Such an instantiation may be referred to herein as the floating point instantiation of the DNN. As described above, since values can typically be represented more accurately, or more precisely, in a floating point number format an instantiation of a DNN that is configured to use floating point number formats to represent values input to, and output, from each layer represents an instantiation of the DNN that will produce the best or most accurate output. Accordingly, the output data generated by the floating point instantiation of the DNN may be used as the benchmark or baseline output against which to gauge the accuracy of output data generated by an instantiation of the DNN using fixed point number formats to represent the values input to, and output from, each layer of the DNN.

As is known to those of skill in the art, a differentiable function is a function whose derivative exists at each point in its domain. In other words, if $x_0$ is a point in the domain of a function g, then g is said to be differentiable at $x_0$ if the derivative $g(x_0)$ exists. An example of a suitable differentiable error is the L1 distance between corresponding logits of the output of the instantiation of the DNN and the baseline output. This is illustrated in equation (11) where z is the set of logits in the baseline output and z' is the set of logits in the output of the instantiation of the DNN:

$$\Sigma_i |z_i - z'_i| \tag{11}$$

In other examples, the differentiable error between the baseline output and the output of the instantiation of the DNN may be calculated as the L1 distance between the outputs of the SoftMax function, with or without an additional temperature parameter T as shown in equation (12). Increasing the temperature T makes the SoftMax values "softer" (i.e. less saturation to 0 and 1) and thereby easier to train against.

$$s_i(z; T) = \frac{e^{z_i/T}}{\sum_j e^{z_j/T}} \tag{12}$$

Once a differentiable error between the output of block 604 and the baseline output has been determined the method 600 proceeds to block 608.

At block 608, the portion of the differentiable error calculated in block 606 attributable to the quantisation of the weights of a layer (either collectively or individually) and/or attributable to the quantisation of the input data values of a layer (either collectively or individually) is estimated using a Taylor approximation (e.g. as set out in equations (6) and (7) above). This may comprise determining the derivatives or gradients of the differentiable error (ε) with respect to the weights $$\left(\frac{\partial \varepsilon}{\partial w_h}\right)$$

and/or input data values $$\left(\frac{\partial \varepsilon}{\partial a_h}\right)$$

using backpropagation as described above (which can be done in a single backpropagation iteration); calculating the portion of the error attributable to the quantisation of a particular weight or input data value by multiplying the quantisation error of that weight or input data value ($q_{w_h}$ or $q_{a_h}$) with the corresponding derivative $$\left(\frac{\partial \varepsilon}{\partial w_h} \text{ or } \frac{\partial \varepsilon}{\partial a_h}\right);$$

and optionally, determining the total error attributable to the quantisation of the weights of each layer by summing the portion of the error attributed to the quantisation of the weights of that layer and/or the total error attributable to the quantisation of the input data values of each layer by summing the portion of the error attributed to the quantisation of the input data values of that layer.

Once the portion of the error attributable to the quantisation of the weights of a layer (either collectively or individually) and/or to the quantisation of the input data values of a layer (either collectively or individually) has been estimated then the method 600 ends.

Figure 8:
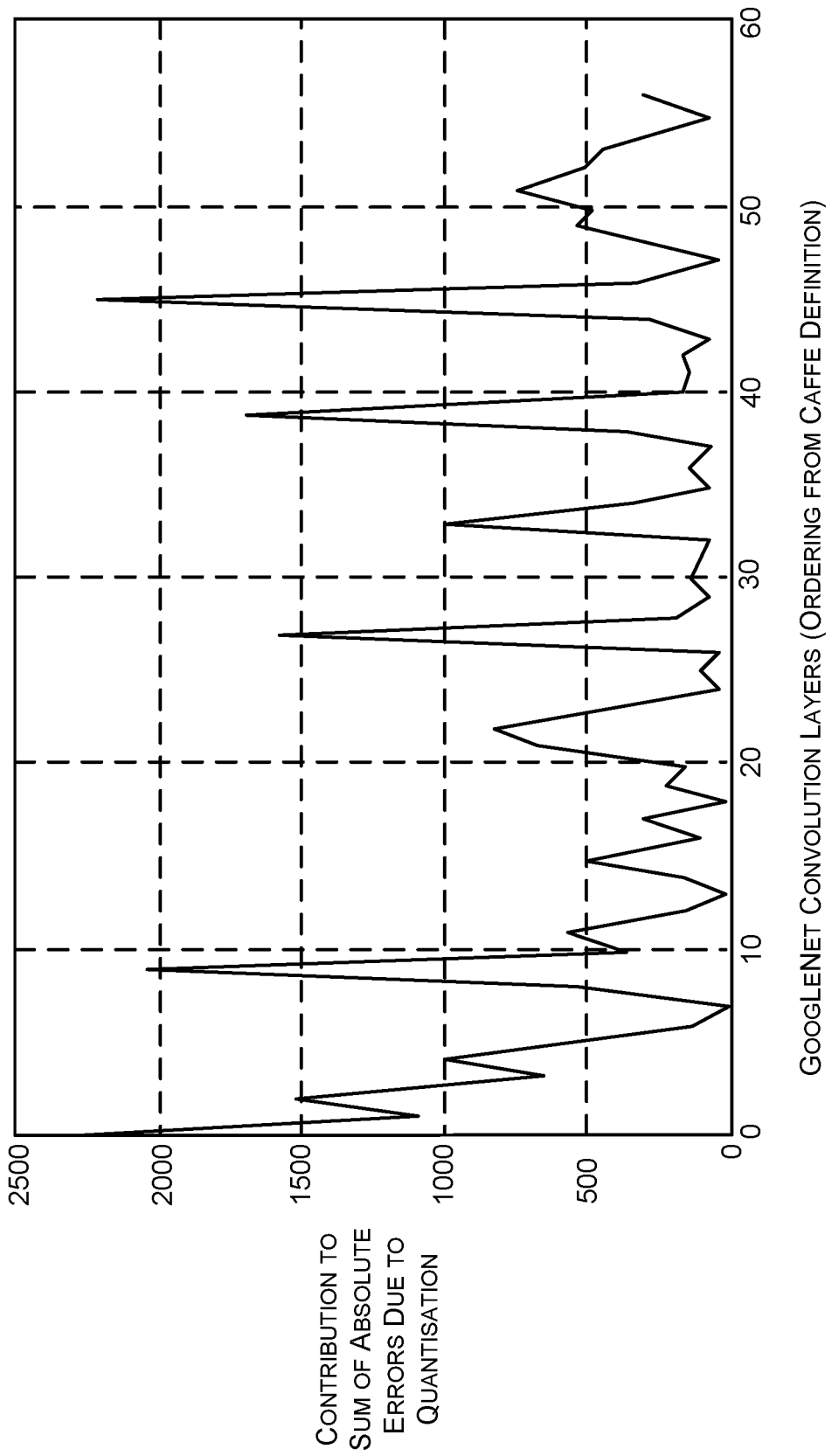
FIG. 8 is a graph illustrating the portions of the output error attributable to the quantisation of the weights of each layer of a GoogLeNet DNN determined in accordance with the method of FIG. 7.

FIG. 8 illustrates the contribution of the quantisation of the weights of each convolution layer to the total sum of absolute errors as estimated using the method 600 of FIG. 6 for a GoogLeNet DNN configured to represent the weights using a fixed point number format comprising a mantissa bit length of 5. It is noted that the actual sum of absolute errors was determined to be 28302.7 whereas the total of the predicated errors (as determined according to the method 600) per layer totaled 26992.0. This illustrates that the method 600 of FIG. 6 is able to apportion the error quite accurately. The small discrepancy is mainly due to inaccurate approximation by the tangent (e.g. tangent 404 of FIG. 4).

Adjusting Fixed Point Number Formats Based on Apportionment of Error

As described above, knowing the contribution of each layer to the output error of a DNN is useful because it may indicate, for example, which layers are likely to incur the least error if the mantissa bit length of the fixed point number format for that layer is reduced.

Figure 9:
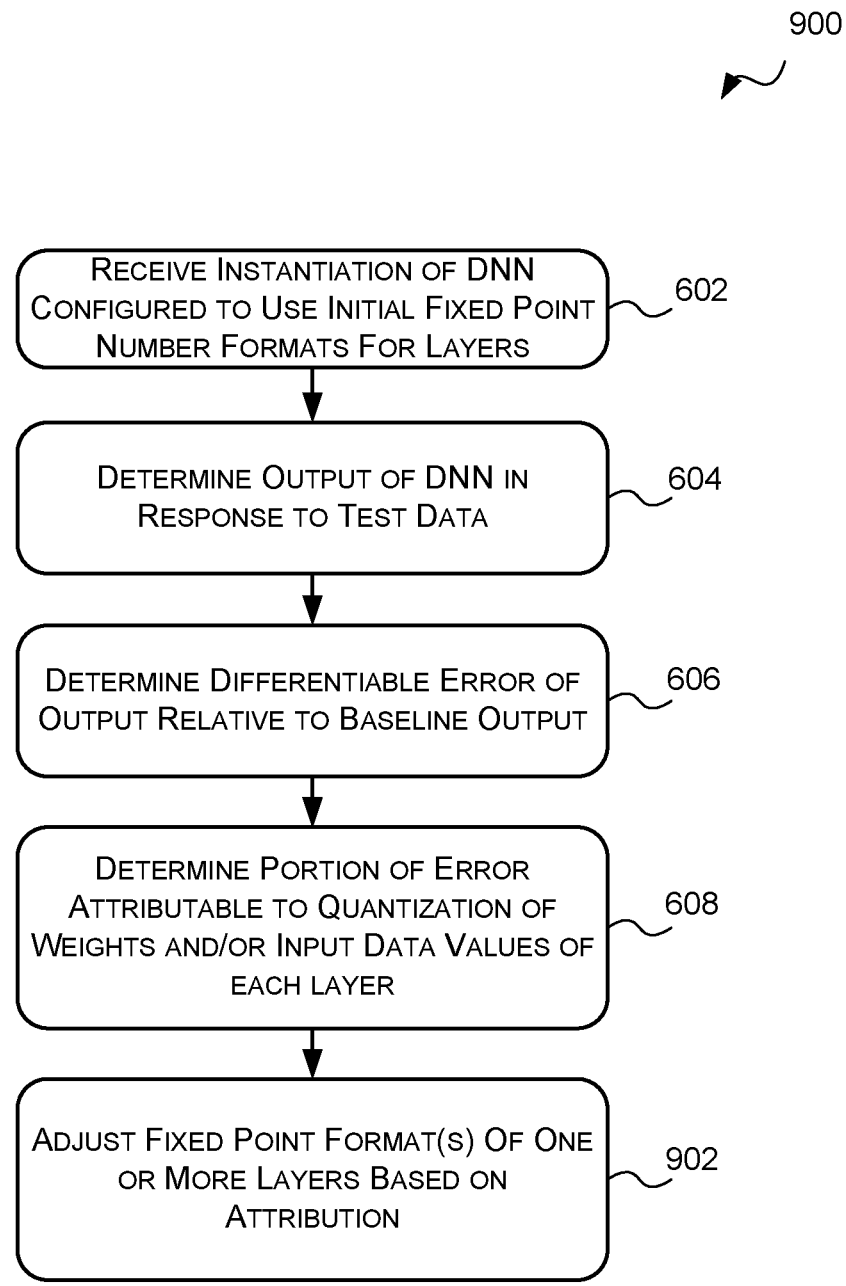
FIG. 9 is a flow diagram of a first example method for determining a fixed point number format for representing weights or input data values of one or more layers of a DNN based on the portion of the output error attributable to the quantisation of the weights and/or input data values of each layer determined using the method of FIG. 6.

Accordingly, reference is now made to FIG. 9 which illustrates a method 900 for determining a fixed point number format for one or more layers of a DNN based on the portion of the output error of the DNN attributed to the quantisation of the weights and/or input data values of each layer. The method 900 of FIG. 9 includes the blocks 602 to 608 of FIG. 6 for determining the portion of the output error of the DNN attributed to the quantisation of the weights and/or input data values of each layer, with an additional block 902 wherein the fixed point number format of one or more layers is adjusted based on the portion of the output error of the DNN attributed to the quantisation of the weights and/or input data values of each layer.

In some cases, the fixed point number format of the layer with the lowest weight quantisation error portion or the lowest input data value quantisation error portion may be adjusted. For example, if a layer has the lowest weight quantisation error portion the fixed point number format used to represent the weights of that layer may be adjusted, or if a layer has the lowest input data value quantisation error portion the fixed point number format used to represent the input data values of that layer may be adjusted. In some examples, the appropriate fixed point number format may be adjusted to reduce the number of mantissa bits. This may comprise adjusting the appropriate fixed point number format to the fixed point number format of the possible fixed point number formats that has the next lowest mantissa bit length and that supports the same range.

Determining the fixed point number format with the next lowest mantissa bit length that supports the same range relative to a particular fixed point number format may comprise (i) selecting the next lowest mantissa bit length (compared to the mantissa bit length of the current fixed point number format) that is supported by the hardware implementation of the DNN that is to be configured; and (ii) adjusting the exponent of the current fixed point number format to account for the reduction in the number of mantissa bits. Adjusting the exponent of the current fixed point number format to account for the reduction in the number of mantissa bits typically comprises increasing the exponent by the same number of bits that have been removed from the mantissa so that the fixed point number format covers the same range of values. For example, if the mantissa bit length is reduced by 4 bits then the exponent may be increased by 4.

Some hardware implementations may only support certain sets of mantissa bit lengths. For example, some hardware implementations of DNNs may only support mantissa bit lengths of 4, 5, 6, 7, 8, 10, 12 and 16. It will be evident to a person of skill in that art, that this is an example only and that other hardware implementations of DNNs may support a different set of mantissa bit lengths, and/or a different number of mantissa bit lengths.

Table 2 illustrates the fixed point number format with the next lowest mantissa bit length for example fixed point number formats, wherein the hardware implementation supports mantissa bit lengths of 4, 5, 6, 7, 8, 10, 12 and 16. The first example fixed point number format comprises an exponent of 2 and a mantissa bit length of 8, the next lowest supported mantissa bit length is 7. This results in a mantissa bit length reduction of 1 bit which causes an exponent increase of 1 to 3. The second example fixed point number format comprises an exponent of 5 and a mantissa bit length of 12, the next lowest supported mantissa bit length is 10. This results in a mantissa bit length reduction of 2 bits which causes an exponent increase of 2 to 7. The third example fixed point number format comprises an exponent 1 and a mantissa bit length of 16, the next lowest supported mantissa bit length is 12. This results in a mantissa bit length reduction of 4 bits which causes an exponent increase of 4 to 5.

TABLE 2

| Fixed Point Number Format | | Fixed Point Number Format with Next Lowest Mantissa Bit Length | |
|---|---|---|---|
| Exponent | Mantissa Bit Length | Exponent | Mantissa Bit Length |
| 2 | 8 | 3 | 7 |
| 5 | 12 | 7 | 10 |
| 1 | 16 | 5 | 12 |

In some cases, the fixed point number format of the layer with the highest weight quantisation error portion or the highest input data value quantisation error portion may be adjusted. For example, if a layer has the highest weight quantisation error portion the fixed point number format used to represent the weights of that layer may be adjusted, or if a layer has the highest input data value quantisation error portion the fixed point number format used to represent the input data values of that layer may be adjusted. In some examples, the appropriate fixed point number format may be adjusted to increase the number of mantissa bits. This may comprise adjusting the appropriate fixed point number format to the fixed point number format of the possible fixed point number formats that has the next highest mantissa bit length and supports the same range. The fixed point number format that has the next highest mantissa bit length and supports the same range may be determined in a similar manner as the fixed point number format that has the next lowest mantissa bit length and supports the same range by determining the next highest supported mantissa bit length and decreasing the exponent by the difference between the original mantissa bit length and the new mantissa bit length.

In some cases, the determination of the portion of the output error of the DNN attributed to the quantisation of the weights and/or input data values of each layer and the adjustment of the fixed point number format of one or more layers based on the determined portions may be iteratively repeated until the accuracy of the amended instantiation of the DNN falls below a predetermined threshold. For example, reference is now made to FIG. 10 which illustrates an example iterative method for determining a fixed point number format for one or more layers of a DNN based on the portion of the output error of the DNN attributed to the quantisation of the weights and/or input data values of each layer.

Figure 10:
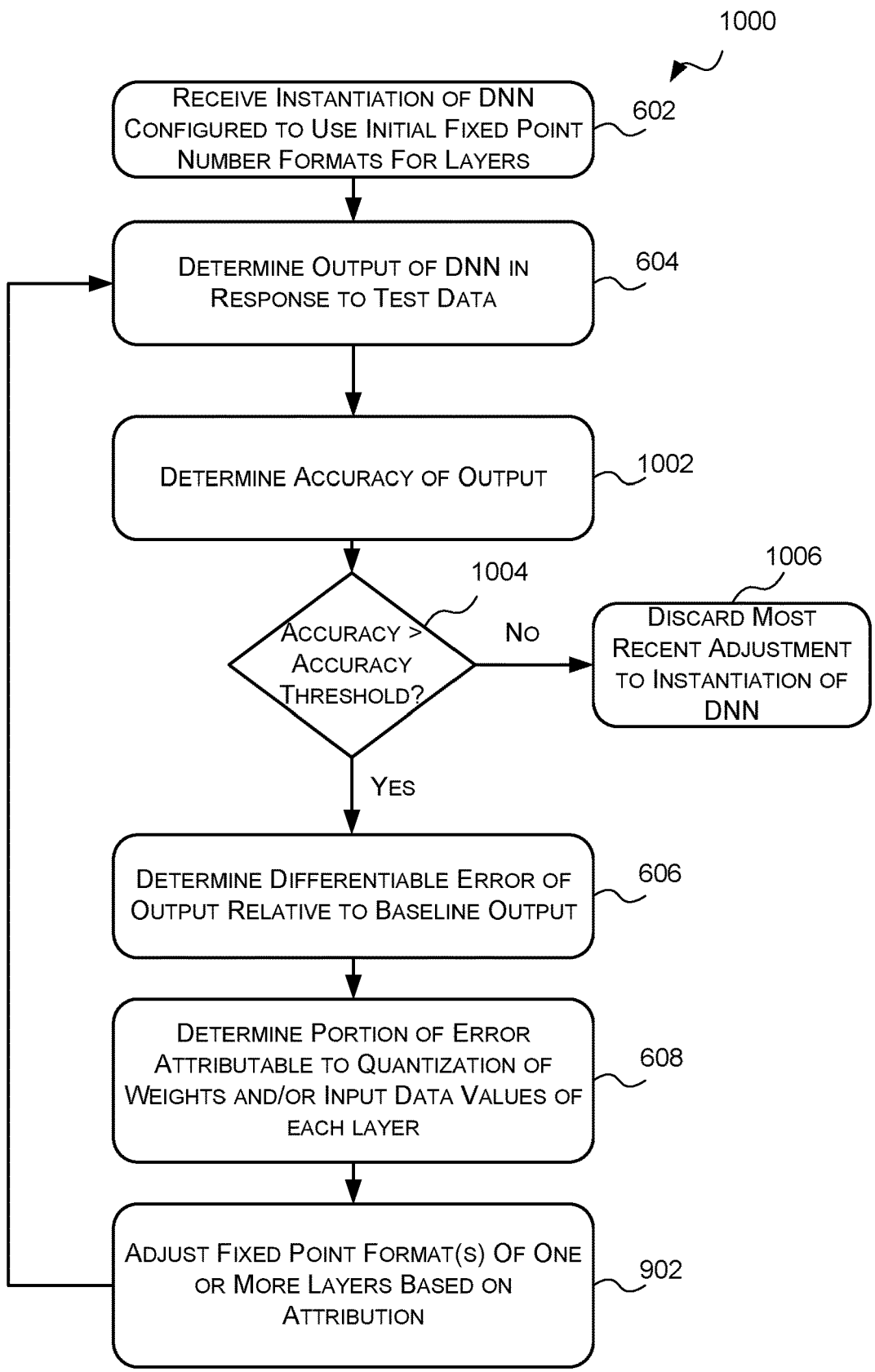
FIG. 10 is a flow diagram of a second example method for determining a fixed point number format for representing weights or input data values of one or more layers of a DNN based on the portion of the output error attributable to the quantisation of the weights and/or input data values of each layer determined using the method of FIG. 6

The method 1000 of FIG. 10 includes the blocks 602 to 608 of FIG. 6 for determining the portion of the output error of the DNN attributed to the quantisation of the weights and/or input data values of each layer, and block 902 for adjusting the fixed point number format of one or more layers based on the portion of the output error of the DNN attributed to the quantisation of the weights and/or input data values of each layer. However, once a fixed point number format is adjusted in block 902 the method returns to block 604 where the output of the DNN (configured to use the adjusted fixed point number format) is then determined in response to the test data. Then at block 1002 the accuracy of the output may be determined. In some cases, the accuracy may be calculated based on the ground-truth accuracy of the output. For example, the accuracy may be calculated as a Top-1 classification accuracy, or a Top-5 classification accuracy based on known correct classifications or labels for the test input data. As is known to those of skill in the art, the Top-1 classification accuracy is a measure of how often the top classification output by the DNN is the correct classification and the Top-5 classification accuracy is a measure of how often the correct classification is in the top five classifications output by the DNN.

The method 1000 then proceeds to block 1004 where a determination is made as to whether the accuracy is less than a predetermined accuracy threshold (ATh). The accuracy threshold may represent an acceptable level of accuracy. If it is determined that the accuracy as determined in block 1002 is greater than or equal to the accuracy threshold (ATh) then the adjustment made in block 902 is accepted and the method 1000 proceeds to block 606. If, however, it is determined that the accuracy is less than the accuracy threshold (ATh) then the method proceeds to block 1006 where the most recent adjustment(s) are discarded or rejected. Rejecting the most recent adjustment may comprise re-adjusting the instantiation of the DNN to revert the fixed point number formats back to what they were prior to the adjustment. Once the adjustments have been rejected the method 1000 ends.

Once one or more fixed point number formats have been adjusted in accordance with method 900 or 1000 the fixed point number formats used in the instantiation of the DNN may be used to configure a hardware implementation of a DNN. For example, the fixed point number formats may be used to configure the DNN to expect to receive the input data values or weights in the identified format. This may allow the hardware implementation to more efficiently process the input data of that layer. In another example, the identified fixed point number formats for a layer may be used to configure the DNN to, when it does not receive the input data values or weights for that layer in the identified fixed point number format, convert the received input data values or weights into the identified fixed point number format to allow the hardware implementation to more efficiently process the input data values or weights of that layer. In yet another example, the identified fixed point number formats may be used to configure the hardware implementation to convert the output data of another layer that feeds into a layer into the identified fixed point number format so that it will be provided to that layer in the identified fixed point number format. An example hardware implementation of a DNN and how the identified formats may be used to configure the hardware implementation are described below with reference to FIG. 11.

Example Hardware Implementation of DNN

Figure 11:
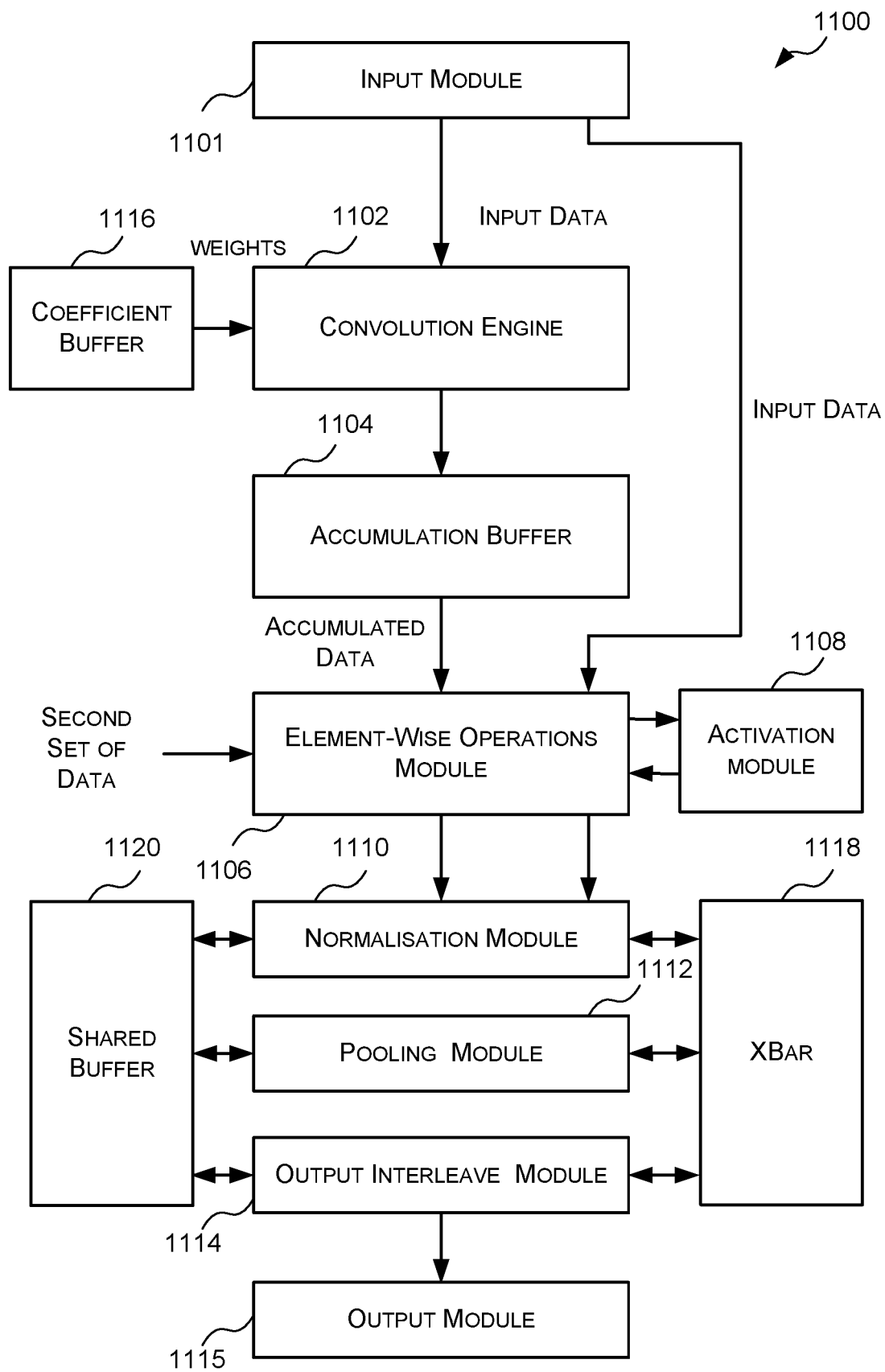
FIG. 11 is a block diagram of an example hardware implementation of a DNN.

Reference is now made to FIG. 11 which illustrates an example hardware implementation of a DNN 1100 which may be configured based on the formats identified using the methods 900, 1000 of FIGS. 9 and 10.

The hardware implementation 1100 of FIG. 11 may be configured to compute the output of a DNN through a series of hardware passes (which also may be referred to as processing passes) wherein during each pass the hardware implementation receives at least a portion of the input data for a layer of the DNN and processes the received input data in accordance with that layer (and optionally in accordance with one or more subsequent layers) to produce processed data. The processed data is either output to memory for use as input data for a subsequent hardware pass or output as the output of the DNN. The number of layers that the hardware implementation can process during a single hardware pass may be based on the size of the data, the hardware implementation and the order of the layers. For example, where the hardware implementation comprises hardware to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN.

The example hardware implementation of a DNN 1100 of FIG. 11 comprises an input module 1101, a convolution engine 1102, an accumulation buffer 1104, an element-wise operations module 1106, an activation module 1108, a normalisation module 1110, a pooling module 1112, an output interleave module 1114 and an output module 1115. Each module or engine implements or processes all or a portion of one or more types of layers. Specifically, together the convolution engine 1102 and the accumulation buffer 1104 implement or process a convolution layer or a fully connected layer. The activation module 1108 processes or implements an activation layer. The normalisation module 1110 processes or implements a normalisation layer. The pooling module 1112 implements a pooling layer and the output interleave module 1114 processes or implements an interleave layer.

The input module 1101 is configured to receive the input data for the current hardware pass and provide it to a downstream module for processing. The downstream module that receives the input data depends on the layers that are to be processed in the current hardware pass.

The convolution engine 1102 is configured to perform a convolution operation on the received input data using the weights associated with a particular convolution layer. The weights for each convolution layer of the DNN may be stored in a coefficient buffer 1116 as shown in FIG. 11 and the weights for a particular convolution layer may be provided to the convolution engine 1102 when that particular convolution layer is being processed by the convolution engine 1102. Where the hardware implementation supports variable weight formats then the convolution engine 1102 may be configured to receive information indicating the format or formats of the weights of the current convolution layer being processed to allow the convolution engine to properly interpret and process the received weights. The weight formats for each convolution layer may be determined by the methods 900, 1000 described herein.

Figure 12:
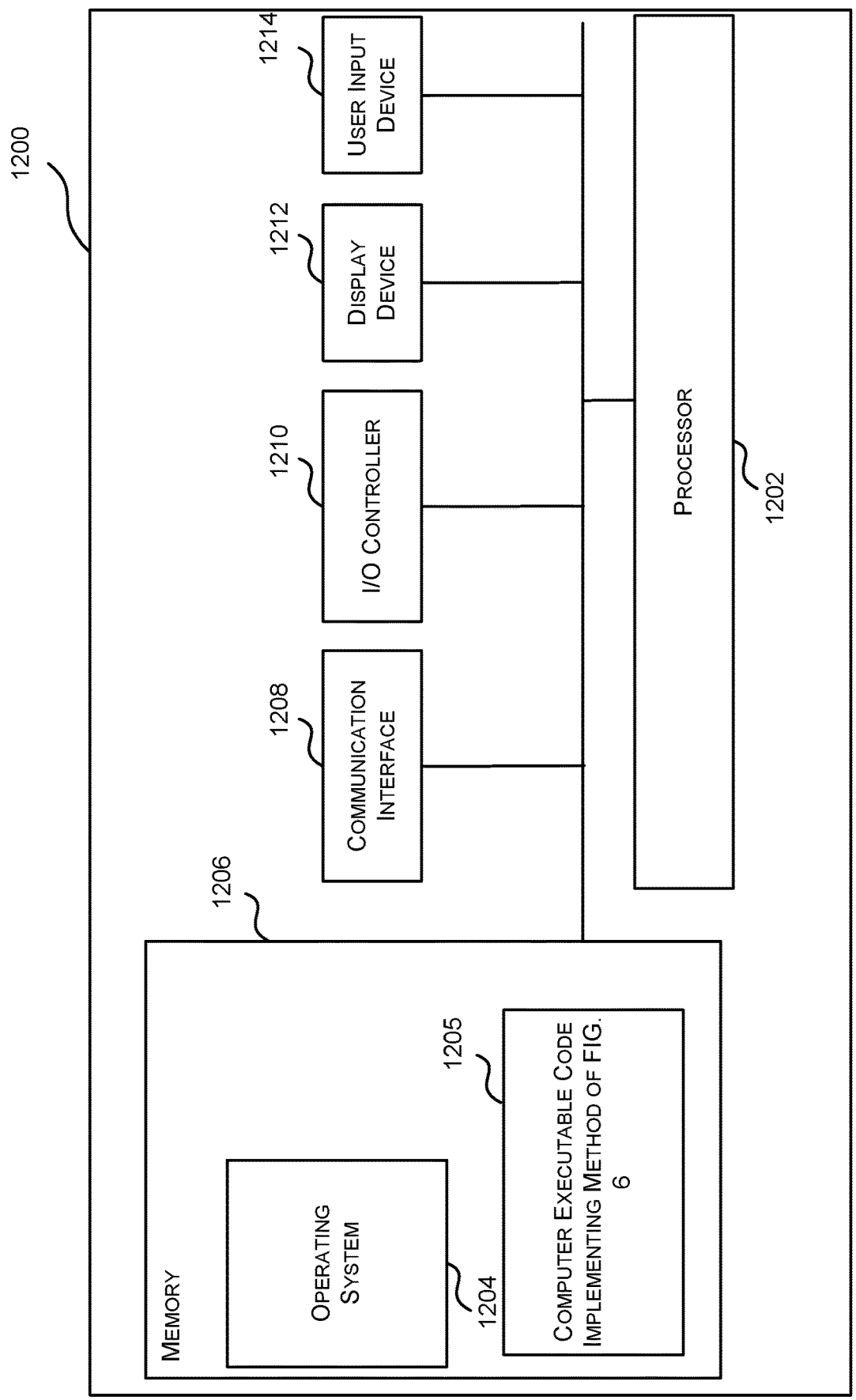
FIG. 12 is a block diagram of an example computing-based device.

The convolution engine 1102 may comprise a plurality of multipliers (e.g. 128) and a plurality of adders which add the result of the multipliers to produce a single sum. Although a single convolution engine 1102 is shown in FIG. 12, in other examples there may be multiple (e.g. 8) convolution engines so that multiple windows can be processed simultaneously. The output of the convolution engine 1102 is fed to the accumulation buffer 1104.

The accumulation buffer 1104 is configured to receive the output of the convolution engine and add it to the current contents of the accumulation buffer 1104. In this manner, the accumulation buffer 1104 accumulates the results of the convolution engine 1102. Although a single accumulation buffer 1104 is shown in FIG. 11, in other examples there may be multiple (e.g. 8, one per convolution engine) accumulation buffers. The accumulation buffer 1104 outputs the accumulated result to the element-wise operations module 1106 which may or may not operate on the accumulated result depending on whether an element-wise layer is to be processed during the current hardware pass.

The element-wise operations module 1106 is configured to receive either the input data for the current hardware pass (e.g. when a convolution layer is not processed in the current hardware pass) or the accumulated result from the accumulation buffer 1104 (e.g. when a convolution layer is processed in the current hardware pass). The element-wise operations module 1106 may either process the received input data or pass the received input data to another module (e.g. the activation module 1108 and/or or the normalisation module 1110) depending on whether an element-wise layer is processed in the current hardware pass and/or depending on whether an activation layer is to be processed prior to an element-wise layer. When the element-wise operations module 1106 is configured to process the received input data the element-wise operations module 1106 performs an element-wise operation on the received data (optionally with another data set (which may be obtained from external memory)). The element-wise operations module 1106 may be configured to perform any suitable element-wise operation such as, but not limited to add, multiply, maximum, and minimum. The result of the element-wise operation is then provided to either the activation module 1108 or the normalisation module 1110 depending on whether an activation layer is to be processed subsequent the element-wise layer or not.

The activation module 1108 is configured to receive one of the following as input data: the original input to the hardware pass (via the element-wise operations module 1106) (e.g. when a convolution layer is not processed in the current hardware pass); the accumulated data (via the element-wise operations module 1106) (e.g. when a convolution layer is processed in the current hardware pass and either an element-wise layer is not processed in the current hardware pass or an element-wise layer is processed in the current hardware pass but follows an activation layer). The activation module 1108 is configured to apply an activation function to the input data and provide the output data back to the element-wise operations module 1106 where it is forwarded to the normalisation module 1110 directly or after the element-wise operations module 1106 processes it. In some cases, the activation function that is applied to the data received by the activation module 1108 may vary per activation layer. In these cases, information specifying one or more properties of an activation function to be applied for each activation layer may be stored (e.g. in memory) and the relevant information for the activation layer processed in a particular hardware pass may be provided to the activation module 1108 during that hardware pass.

In some cases, the activation module 1108 may be configured to store, in entries of a lookup table, data representing the activation function. In these cases, the input data may be used to lookup one or more entries in the lookup table and output values representing the output of the activation function. For example, the activation module 1108 may be configured to calculate the output value by interpolating between two or more entries read from the lookup table.

In some examples, the activation module 1108 may be configured to operate as a Rectified Linear Unit (ReLU) by implementing a ReLU function. In a ReLU function, the output element $y_{i,j,k}$ is calculated by identifying a maximum value as set out in equation (12) wherein for x values less than 0, y=0:

$$y_{i,j,k} = f(x_{i,j,k}) = \max\{0, x_{i,j,k}\} \qquad (13)$$

In other examples, the activation module 1108 may be configured to operate as a Parametric Rectified Linear Unit (PReLU) by implementing a PReLU function. The PReLU function performs a similar operation to the ReLU function. Specifically, where $w_1, w_2, b_1, b_2 \in \mathbb{R}$ are constants, the PReLU is configured to generate an output element $y_{i,j,k}$ as set out in equation (14):

$$y_{i,j,k} = f(x_{i,j,k}; w_1, w_2, b_1, b_2) = \max\{(w_1 * x_{i,j,k} + b_1), (w_2 * x_{i,j,k} + b_2)\} \qquad (14)$$

The normalisation module 1110 is configured to receive one of the following as input data: the original input data for the hardware pass (via the element-wise operations module 1306) (e.g. when a convolution layer is not processed in the current hardware pass and neither an element-wise layer nor an activation layer is processed in the current hardware pass); the accumulation output (via the element-wise operations module 1106) (e.g. when a convolution layer is processed in the current hardware pass and neither an element-wise layer nor an activation layer is processed in the current hardware pass); and the output data of the element-wise operations module and/or the activation module. The normalisation module 1110 then performs a normalisation function on the received input data to produce normalised data. In some cases, the normalisation module 1110 may be configured to perform a Local Response Normalisation (LRN) Function and/or a Local Contrast Normalisation (LCN) Function. However, it will be evident to a person of skill in the art that these are examples only and that the normalisation module 1110 may be configured to implement any suitable normalisation function or functions. Different normalisation layers may be configured to apply different normalisation functions.

The pooling module 1112 may receive the normalised data from the normalisation module 1110 or may receive the input data to the normalisation module 1110 via the normalisation module 1110. In some cases, data may be transferred between the normalisation module 1110 and the pooling module 1112 via an XBar 1118. The term "XBar" is used herein to refer to a simple hardware module that contains routing logic which connects multiple modules together in a dynamic fashion. In this example, the XBar may dynamically connect the normalisation module 1110, the pooling module 1112 and/or the output interleave module 1114 depending on which layers will be processed in the current hardware pass. Accordingly, the XBar may receive information each hardware pass indicating which modules 1110, 1112, 1114 are to be connected.

The pooling module 1112 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave module 1114 may receive the normalised data from the normalisation module 1110, the input data to the normalisation function (via the normalisation module 1110), or the pooled data from the pooling module 1112. In some cases, the data may be transferred between the normalisation module 1110, the pooling module 1112 and the output interleave module 1114 via an XBar 1118. The output interleave module 1114 is configured to perform a rearrangement operation to produce data that is in a predetermined order. This may comprise sorting and/or transposing the received data. The data generated by the last of the layers is provided to the output module 1115 where it is converted to the desired output format for the current hardware pass. The desired output format may be determined according to the methods 900 and 1000 described herein (e.g. as the fixed point format for representing the input data values of the first layer of the next hardware pass).

The normalisation module 1110, the pooling module 1112, and the output interleave module 1114 may each have access to a shared buffer 1120 which can be used by these modules 1110, 1112 and 1114 to write data to and retrieve data from. For example, the shared buffer 1120 may be used by these modules 1110, 1112, 1114 to rearrange the order of the received data or the generated data. For example, one or more of these modules 1110, 1112, 1114 may be configured to write data to the shared buffer 1120 and read the same data out in a different order. In some cases, although each of the normalisation module 1110, the pooling module 1112 and the output interleave module 1114 have access to the shared buffer 1120, each of the normalisation module 1110, the pooling module 1112 and the output interleave module 1114 may be allotted a portion of the shared buffer 1120 which only they can access. In these cases, each of the normalisation module 1110, the pooling module 1112 and the output interleave module 1114 may only be able to read data out of the shared buffer 1120 that they have written in to the shared buffer 1120.

As described above the modules of the hardware implementation 1100 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the hardware implementation may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first convolution layer needs to be written out to memory before it can be used as an input to the second convolution layer. In each of these hardware passes only the modules, components or engines relevant to a convolution layer, such as the convolution engine 1102 and the accumulation buffer 1104, may be used or active.

Although the hardware implementation 1100 of FIG. 11 illustrates a particular order in which the modules, engines etc. are arranged and thus how the processing of data flows through the hardware implementation, it will be appreciated that this is an example only and that in other examples the modules, engines etc. may be arranged in a different manner. Furthermore, other hardware implementations may implement additional or alternative types of DNN layers and thus may comprise different modules, engines etc.

FIG. 12 illustrates various components of an exemplary general purpose computing-based device 1200 which may be implemented as any form of a computing and/or electronic device, and in which embodiments of the methods 600, 900, 1000 described above may be implemented.

Computing-based device 1200 comprises one or more processors 1202 which may be microprocessors, controllers or any other suitable type of processors for processing computer executable instructions to determine a fixed point number format for representing weights or input data values of one or more layers of a DNN based on the portion of errors attributable to the quantisation of the weights and/or input data values of each layer. In some examples, for example where a system on a chip architecture is used, the processors 1202 may include one or more fixed function blocks (also referred to as accelerators) which implement a part of the method of determining a fixed point number format for representing weights or input data values of one or more layers of a DNN based on the portion of errors attributable to the quantisation of the weights and/or input data values of each layer in hardware (rather than software or firmware). Platform software comprising an operating system 1204 or any other suitable platform software may be provided at the computing-based device to enable application software 1205, such as computer executable code for implementing the methods 600, 900, 1000 of FIGS. 6, 9 and 10, to be executed on the device.

The computer executable instructions may be provided using any computer-readable media that is accessible by computing based device 1200. Computer-readable media may include, for example, computer storage media such as memory 1206 and communications media. Computer storage media (i.e. non-transitory machine readable media), such as memory 1206, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1206) is shown within the computing-based device 1200 it will be appreciated that the storage may be distributed or located remotely and accessed via a network or other communication link (e.g. using communication interface 1208).

The computing-based device 1200 also comprises an input/output controller 1210 arranged to output display information to a display device 1212 which may be separate from or integral to the computing-based device 1200. The display information may provide a graphical user interface. The input/output controller 1210 is also arranged to receive and process input from one or more devices, such as a user input device 1214 (e.g. a mouse or a keyboard). In an embodiment the display device 1212 may also act as the user input device 1214 if it is a touch sensitive display device. The input/output controller 1210 may also output data to devices other than the display device, e.g. a locally connected printing device (not shown in FIG. 12).

Figure 13:
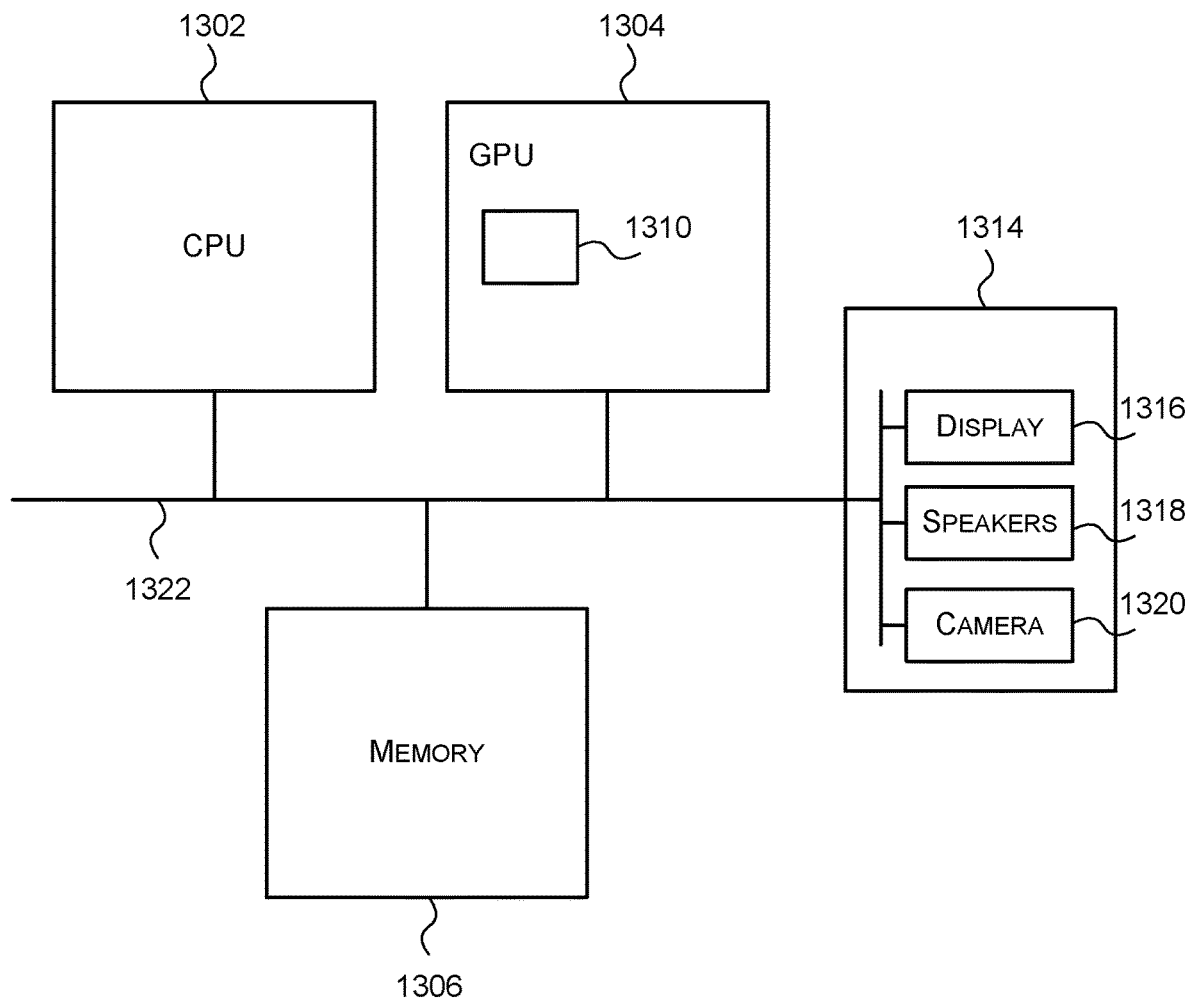
FIG. 13 is a block diagram of an example computer system in which the hardware implementation of the DNN of FIG. 11 is implemented.

FIG. 13 shows a computer system in which the hardware implementations for a DNN described herein may be implemented. The computer system comprises a CPU 1302, a GPU 1304, a memory 1306 and other devices 1314, such as a display 1316, speakers 1318 and a camera 1320. A hardware implementation of a DNN 1310 (corresponding to the hardware implementation of a DNN 1100) may be implemented on the GPU 1304, as shown in FIG. 13. In some examples, there may not be a GPU and the CPU may provide control information to the hardware implementation of a DNN 1310. The components of the computer system can communicate with each other via a communications bus 1322. In other examples, the hardware implementation of a DNN 1310 may be implemented independent from the CPU or the GPU and may have a separate connection to the communications bus 1322.

The hardware implementation of a DNN 1100 of FIG. 11 is shown as comprising a number of functional blocks. This is schematic only and is not intended to define a strict division between different logic elements of such entities. Each functional block may be provided in any suitable manner. It is to be understood that intermediate values described herein as being formed by a hardware implementation of a DNN need not be physically generated by the hardware implementation of a DNN or the processing module at any point and may merely represent logical values which conveniently describe the processing performed by the hardware implementation of a DNN between its input and output.

The hardware implementations of a DNN described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware implementation of a DNN described herein. An integrated circuit definition dataset may be, for example, an integrated circuit description.

Therefore, there may be provided a method of manufacturing, at an integrated circuit manufacturing system, a hardware implementation of a DNN as described herein. Furthermore, there may be provided an integrated circuit definition dataset that, when processed in an integrated circuit manufacturing system, causes the method of manufacturing a hardware implementation of a DNN to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation of a DNN will now be described with respect to FIG. 14.

Figure 14:
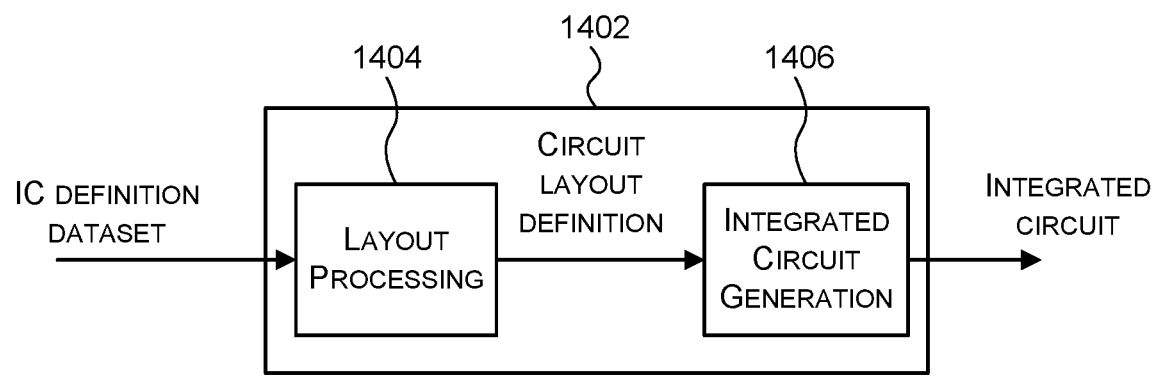
FIG. 14 is a block diagram of an example integrated circuit manufacturing system for generating an integrated circuit embodying a hardware implementation of a DNN as described herein.

FIG. 14 shows an example of an integrated circuit (IC) manufacturing system 1402 which is configured to manufacture a hardware implementation of a DNN as described in any of the examples herein. In particular, the IC manufacturing system 1402 comprises a layout processing system 1404 and an integrated circuit generation system 1406. The IC manufacturing system 1402 is configured to receive an IC definition dataset (e.g. defining a hardware implementation of a DNN as described in any of the examples herein), process the IC definition dataset, and generate an IC according to the IC definition dataset (e.g. which embodies a hardware implementation of a DNN as described in any of the examples herein). The processing of the IC definition dataset configures the IC manufacturing system 1402 to manufacture an integrated circuit embodying a hardware implementation of a DNN as described in any of the examples herein.

The layout processing system 1404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1404 has determined the circuit layout it may output a circuit layout definition to the IC generation system 1406. A circuit layout definition may be, for example, a circuit layout description.

The IC generation system 1406 generates an IC according to the circuit layout definition, as is known in the art. For example, the IC generation system 1406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1406 may be in the form of computer-readable code which the IC generation system 1406 can use to form a suitable mask for use in generating an IC.

The different processes performed by the IC manufacturing system 1402 may be implemented all in one location, e.g. by one party. Alternatively, the IC manufacturing system 1402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation of a DNN without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 14 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 14, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of determining a fixed point number format for representing values of one or more layers of a Deep Neural Network (DNN) for use in configuring a hardware implementation of the DNN, the values comprising at least one of weights and input data values, the method comprising:
receiving an instantiation of the DNN configured to represent values of one or more layers according to one or more initial fixed point number formats for that layer;
determining an output of the instantiation of the DNN in response to test input data;
determining a differentiable error in the output of the instantiation of the DNN relative to a baseline output;
determining a portion of the differentiable error related to quantisation of the values of each of the one or more layers using a Taylor approximation; and
adjusting a fixed point number format for at least one of the one or more layers based on the portion of the differentiable error related to quantisation of the values of each of the one or more layers.

2. The method of claim 1, wherein the fixed point number format of the layer with a lowest weight quantisation error portion and/or a lowest input data value quantisation error portion is adjusted.

3. The method of claim 2, wherein each fixed point number format comprises an exponent and a mantissa bit length and adjusting the fixed point number format comprises adjusting the fixed point number format to a fixed point number format that has a next lowest mantissa bit length.

4. The method of claim 1, wherein the fixed point number format of the layer with a highest weight quantisation error portion and/or a highest input data value quantisation error portion is adjusted.

5. The method of claim 4, wherein each fixed point number format comprises an exponent and a mantissa bit length and adjusting the fixed point number format comprises adjusting the fixed point number format to a fixed point number format that has a next highest mantissa bit length.

6. The method of claim 1, further comprising:
subsequent to the adjusting, determining an accuracy of an output of the instantiation of the DNN in response to test input data; and
in response to determining that the accuracy of the output of the instantiation of the DNN exceeds an accuracy threshold, repeating the determining a differentiable error, the determining the portions, and the adjusting.

7. The method of claim 6, further comprising, in response to determining that the accuracy of the output of the instantiation of the DNN does not exceed the accuracy threshold, discarding the adjustment.

8. The method of claim 6, wherein the DNN is a classification network and the accuracy of the output of the instantiation of the DNN is a Top-1 classification accuracy or a Top-5 classification accuracy.

9. The method of claim 1, wherein determining the portion of the differentiable error related to quantisation of the values of each of the one or more layers using a Taylor approximation comprises:
determining gradients of the differentiable error with respect to the values using backpropagation; and
calculating the portion of the differentiable error attributable to the quantisation of a particular value by multiplying a quantisation error for that value with the corresponding gradient.

10. The method of claim 9, wherein determining the portion of the differential error related to the quantisation of the values of each of the one or more layers further comprises determining a total error attributable to the quantisation of the weights of each of the one or more layers by summing the portion of the differentiable error attributable to the quantisation of the weights of that layer and/or determining a total error attributable to the quantisation of the input data values of each of the one or more layers by summing the portion of the differentiable error attributable to the quantisation of the input data values of that layer.

11. The method of claim 1, wherein the DNN is a classification network and the differentiable error is a sum of L1 differences between logits of the output of the instantiation of the DNN in response to the test input data and logits of the baseline output.

12. The method of claim 1, wherein the DNN is a classification network and the differentiable error is a sum of L1 differences between SoftMax normalised logits of the output of the instantiation of the DNN in response to test input data and SoftMax normalised logits of the baseline output.

13. The method of claim 1, further comprising generating the baseline output by applying the test input data to an instantiation of the DNN configured to represent values input to and output from each layer of the DNN using a floating point number format.

14. The method of claim 1, further comprising, subsequent to the adjustment(s), outputting the fixed point number formats for the one or more layers for configuring a hardware implementation of a DNN.

15. The method of claim 1, further comprising, subsequent to the adjustment(s), configuring a hardware implementation of the DNN to represent the weights and/or input data values of at least one of the one or more layers using the fixed point number format for the at least one layer.

16. A non-transitory computer readable storage medium having stored thereon computer readable instructions that, when executed at a computer system, cause the computer system to perform the method as set forth in claim 1.

17. A computing-based device for determining a fixed point number format for representing values of one or more layers of a Deep Neural Network (DNN) for use in configuring a hardware implementation of the DNN, the values comprising at least one of input data values and weights, the computing-based device comprising:
at least one processor; and
memory coupled to the at least one processor, the memory comprising:
an instantiation of the DNN configured to represent values of one or more layers according to one or more initial fixed point number formats for that layer, and
computer readable code that when executed by the at least one processor causes the at least one processor to:
determine an output of the instantiation of the DNN in response to test input data,
determine a differentiable error in the output of the instantiation of the DNN relative to a baseline output, determine a portion of the differentiable error related to quantisation of the values of each of the one or more layers using a Taylor approximation, and adjust a fixed point number format for at least one of the one or more layers based on the portion of the differentiable error related to quantisation of the values of each of the one or more layers.

18. A hardware implementation of a Deep Neural Network (DNN) comprising:

hardware logic configured to:

receive input data values to a layer of the DNN, receive information indicating a fixed point number format for the input data values of the layer, the fixed point number format for the input data values of the layer having been selected in accordance with the method as set forth in claim 1, interpret the input data values based on the fixed point number format for the input data values of the layer, and process the interpreted input data values in accordance with the layer to generate output data values for the layer.

19. The hardware implementation of claim 18, wherein the hardware logic is further configured to:

receive a set of weights for the layer;

receive information indicating a fixed point number format for the weights of the layer, the fixed point number format for the weights of the layer having been selected in accordance with the method as set forth in claim 1;

interpret the weights based on the fixed point number format for the weights of the layer; and process the interpreted input data values in accordance with the interpreted weights to generate the output data values for the layer.

* * * * *